March 15, 1960 W. A. BIERMANN ET AL 2,928,407
FUEL VALVE LIMIT CONTROL
Filed Jan. 29, 1958
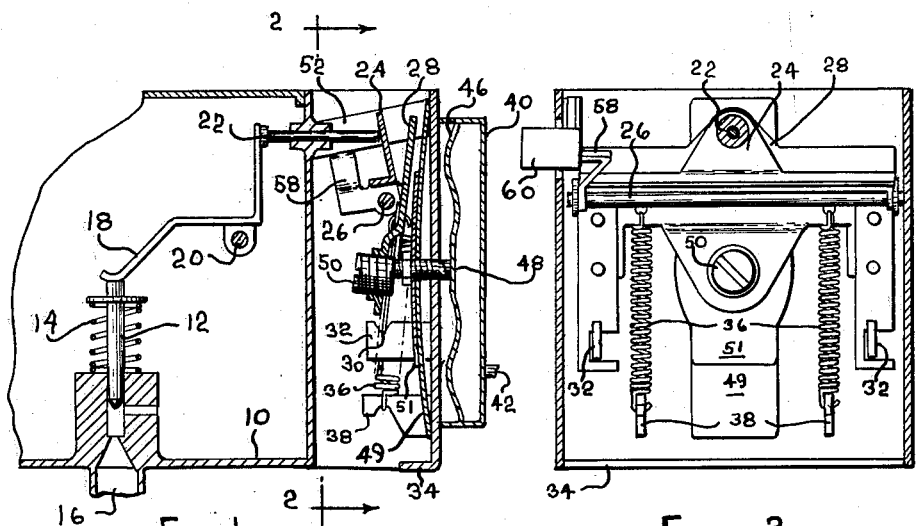
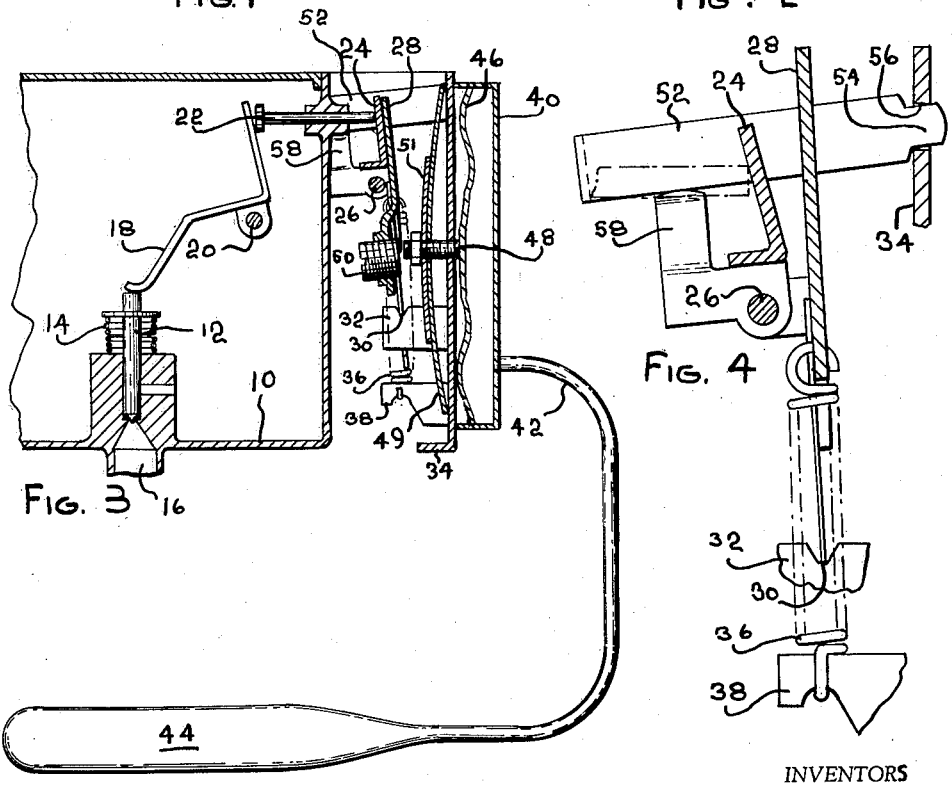
INVENTORS
WILLIAM A. BIERMANN
LOURDES V. McCARTY
BY
John W. Michael
ATTORNEY

2,928,407
FUEL VALVE LIMIT CONTROL

William A. Biermann and Lourdes V. McCarty, Milwaukee, Wis., assignors to Controls Company of America, Schiller Park, Ill., a corporation of Delaware Application January 29, 1958, Serial No. 711,858

2 Claims. (Cl. 137—79)

This invention relates to a limit control for a fuel control valve.

Oil control valves of the types are frequently provided with a limit control which shuts off fuel flow upon occurrence of an unsafe condition. These control valves customarily respond to an excessive stack or bonnet temperature which, in turn, is generally indicative of some other defect in the system. Before resetting the limit control the defect should be investigated and remedied. If the cause is not remedied the control will again close the valve. Experience has shown that many people, when confronted with chronic shut-down, will not remedy the cause but will lock out the limit control which is obviously very dangerous. The present invention prevents locking out the limit control while operating the fuel valve. This is accomplished by preventing fuel flow to the burner when the reset is actuated to reset the limit control or is locked down to prevent operation of the limit control.

The principal object of this invention is to provide a limit control for an oil control valve which can not be bypassed.

Other objects and advantages will be pointed out in, or be apparent from, the specification and claims, as will obvious modifications of the single embodiment shown in the drawings, in which:

Figure 1 is a somewhat schematic section through the present control mechanism;

Figure 2 is a view from line 2—2 in Figure 1;

Figure 3 is similar to Figure 1 but shows the limit control tripped; and

Figure 4 is an enlarged section showing the manner in which the reset lever acts on the mechanism.

Referring now to the drawings in detail, the oil control valve casing 10 is of the type adapted to contain a constant level of oil with the flow from the casing to the burner (not shown) being regulated by valve 12 biased open by spring 14 and which may be controlled either manually or automatically to regulate the flow to the burner through conduit 16. The casing is provided with a crank 18 pivoted on pin 20 and bearing on top of valve 12. The other end of crank 18 acts on pin 22 which projects through a cooperating hole in the wall of the casing to rest on the idler lever 24 pivotally mounted on pin 26 carried by toggle lever 28. Toggle lever 28 pivots in notches 30, 30 in brackets 32, 32 projecting from the frame or base 34. The toggle lever is held in the notch by tensioned toggle springs 36, 36 connected to the lever 28 and to brackets 38, 38 also projecting from base 34.

Diaphragm chamber 40 is mounted on base 34 with the capillary tube 42 extending therefrom to bulb 44 which may be located in the bonnet or stack to sense the temperature at the desired location. When the sensed temperature exceeds a predetermined temperature the volume within the diaphragm chamber will have increased sufficiently to flex diaphragm 46 far enough to the left so that the diaphragm push pin 48, loaded by flat springs 49, 51 will act against the adjusting or calibrating screw 50 in the toggle lever to push the toggle lever to the left over center to snap to the left. When this occurs (as shown in Figure 3) the toggle lever drives against the idler lever 24 to force pin 22 against crank 18 to rotate the crank in a counter-clockwise direction and drive valve 12 shut. Obviously, the toggle springs 36, 36 are stronger than valve spring 14.

A reset lever 52 is pivotally mounted in the frame 34 by projecting the reduced end 54 into the opening 56. The reset overlies arm 58 projecting up from the idler lever and projects through a slot in the frame 34 for manual actuation by depressing the end 60 of the reset. When the reset is depressed it bears down on arm 58 and tends to rotate the idler lever about its pivot 26 in a counter-clockwise direction. However, the idler lever is resting against pin 22 and in order to rotate the lever the pivot point 26 carried by the toggle lever 28 must move. Thus, in effect, the idler lever rotates about its point of contact with pin 22 when the reset is depressed. This forces the pivot 26 to the right as shown in Figure 4 and this, in turn, drives toggle lever 28 to the right. As soon as the toggle lever passes over center it will snap to its normal position and reset 52 may be released, whereupon the spring 14 acting on valve 12 may open the valve.

It will be noted that it is impossible to hold the reset down in order to manually over-ride the limit control action. Thus, any time the reset is depressed the force exerted on the reset is transmitted to the outlet valve 12 to hold the valve shut. In order to get flow to the burner it is necessary that the limit control be operative. This mechanism, therefore, renders the control safe in that it prevents manual over-ride of the limit control and necessitates remedying the cause of repeated operation of the limit control before the burner can be placed into normal operation.

Frame 34 and the associated diaphragm and toggle levers, etc. can all be manufactured as a separate unit for installation by the manufacturer or in the field. Since the control is snap-acting it could be applied to gas valves.

Although but one embodiment of the present invention has been illustrated and described, it will be apparent to those skilled in the art that various changes and modifications may be made therein without departing from the spirit of the invention or from the scope of the appended claims.

We claim:

1. A limit control for fuel control valves comprising, snap acting motor means including a diaphragm and a toggle acting lever responsive to a remote condition to move from a normal inoperative position to an operative trip position in response to an abnormal condition, motion transmitting means comprising an idler lever pivoted on the toggle lever for transmitting motion from the motor means to a valve actuating mechanism to close the valve upon operation of the motor means, and reset means acting during resetting on the idler lever in a direction to force it against the valve mechanism and to simultaneously force the toggle lever back to its normal position whereby the valve is held shut during the resulting operation.

2. A limit controlled fuel valve including, a valve for regulating fuel flow to a burner, toggle acting motor means operatively connected to said valve and responsive to a predetermined condition to move from an inoperative position to an operative position in which the valve is closed, said motor means including a toggle lever connected to the valve by means including an idler lever pivoted on the toggle lever, reset means for to its inoperative position and including means operative during the resetting operation to hold the valve closed, the reset means acting on the idler lever, the idler lever being so mounted that when acted upon by the reset means part of the actuating force is utilized to reset the toggle lever and the other part of the actuating force acts on the valve in the valve closing direction.

References Cited in the file of this patent

UNITED STATES PATENTS

| | | |
|---|---|---|
| 2,475,430 | Kronmiller | July 5, 1949 |
| 2,612,946 | Cobb | Oct. 7, 1952 |

UNITED STATES PATENT OFFICE
CERTIFICATE OF CORRECTION

Patent No. 2,928,407 March 15, 1960

William A. Biermann et al.

It is hereby certified that error appears in the printed specification of the above numbered patent requiring correction and that the said Letters Patent should read as corrected below.

Column 2, line 70, after "for" insert -- resetting the motor means --.

Signed and sealed this 27th day of September 1960.

(SEAL)
Attest:
KARL H. AXLINE
Attesting Officer

ROBERT C. WATSON
Commissioner of Patents